May 26, 1970 W. T. GRUBB 3,514,335
PROCESS AND APPARATUS FOR ELECTROCHEMICALLY OXIDIZING
ALCOHOL TO GENERATE ELECTRICAL ENERGY
Filed Dec. 30, 1966
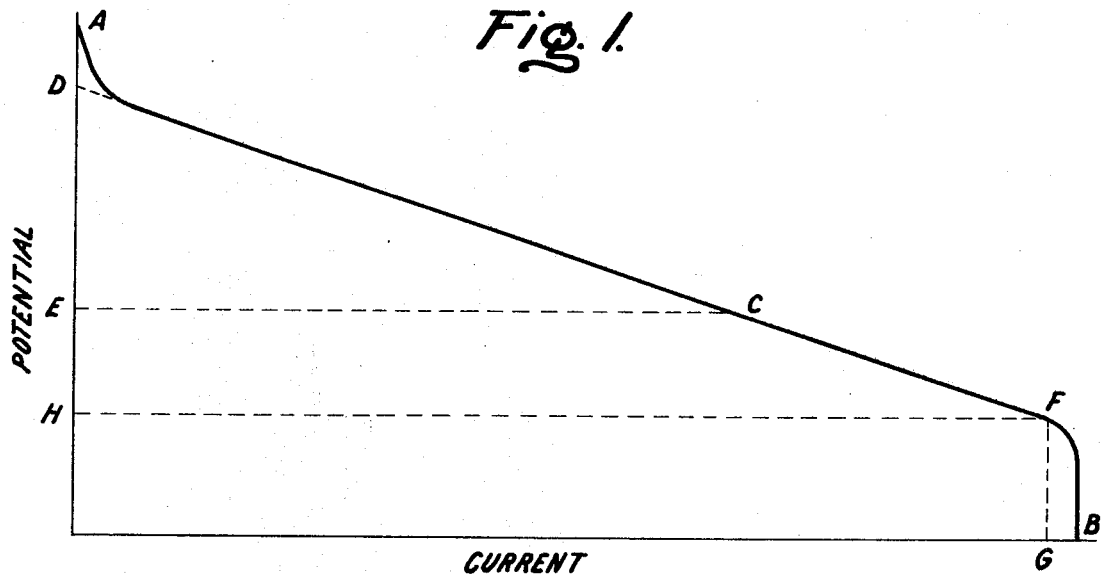
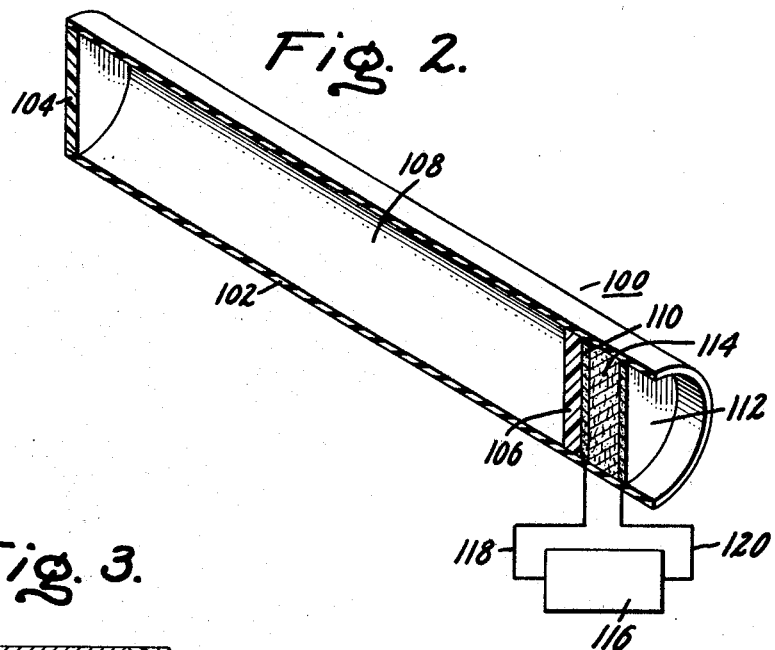
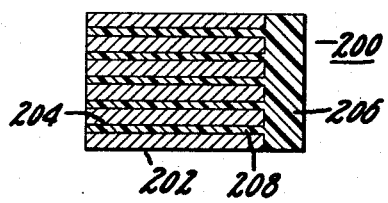
Inventor:
Willard T. Grubb,
by Carl O. Thomas
His Attorney.

United States Patent Office 3,514,335
Patented May 26, 1970

3,514,335
PROCESS AND APPARATUS FOR ELECTROCHEM-
ICALLY OXIDIZING ALCOHOL TO GENERATE
ELECTRICAL ENERGY
Willard T. Grubb, Schenectady, N.Y., assignor to General
Electric Company, a corporation of New York
Filed Dec. 30, 1966, Ser. No. 606,096
Int. Cl. H01m 27/00, 27/30
U.S. Cl. 136—86                                    7 Claims

ABSTRACT OF THE DISCLOSURE

An alcohol permeable element is provided to control the rate at which alcohol is supplied to a fuel cell anode. This restricts the rate of alcohol supply to a value at which it would control the value of the limiting current obtained if the electrodes of the fuel cell were short circuited. By then maintaining an electrical load connected between the electrodes at a resistance value chosen to draw an electrical current only slightly less than the limiting current, the alcohol is almost entirely electrochemically utilized.

---

My invention is believed to be classifiable with primary batteries having gas electrodes.

A considerable amount of research has been undertaken in recent years to develop a fuel cell capable of efficiently producing electrical energy at low cost. Hydrogen is the most successful known fuel. It has, however, been subject to the criticisms of high cost as compared to common fossil fuels, such as liquid hydrocarbons, and of requiring storage as a gas. While liquid hydrocarbons are more easily stored and handled as well as of much lower cost, they are comparatively difficult to oxidize on a fuel cell anode.

Methanol as well as other lower molecular weight alcohols have been proposed as compromise fuels since their cost and reactivity are intermediate the cost and reactivity of hydrogen and the liquid hydrocarbons. One disadvantage that has been associated with the use of alcohols as a fuel is their tendency to migrate through the fuel cell electrolyte. This wastes a substantial proportion of alcohol, contributes to polarization and overheating of the fuel cell, and, in many cases, poses a fire hazard.

It is an object of my invention to provide a method and apparatus for generating electrical energy in which alcohol is efficiently electrochemically oxidized.

These and other objects of my invention are accomplished by electrochemically oxidizing an alcohol having less than four carbon atoms at a porous anode. At the same time oxidant is electrochemically reduced at a porous cathode while the anode and the cathode are ionically communicated by an electrolyte. Electrical energy is supplied to an external electrical load connected to the anode and the cathode. My improvement resides in restricting the rate of alcohol supply to the anode to a value at which it would control the limiting current obtainable if the anode and cathode were short circuited and in continuously maintaining the electrical load at a resistance value chosen to draw an electrical current only slightly less than the limiting current.

In another aspect, my invention is directed to a fuel cell comprised of a porous anode, a porous cathode, electrolyte means ionically communicating the anode and the cathode, and means for introducing alcohol into contact with the anode. My improvement resides in incorporating an alcohol permeable element for controlling the rate at which alcohol is supplied to the anode.

My invention may be better understood by reference to the following detailed description considered in conjunction with the drawings, in which FIG. 1 is a polarization curve;
FIG. 2 is an isometric view, vertically sectioned, of a fuel cell unit constructed according to my invention; and
FIG. 3 is a sectional view of an alcohol permeable element.

FIG. 1 illustrates a typical polarization curve obtainable by operating an alcohol fuel cell. The curve illustrates the relationship of cell potential, measured in volts, to current output, measured in amperes. The point A at the left extremity of the curve is usually referred to as the open circuit potential. This is the potential that is developed between the electrodes when no current is flowing. The open circuit potential for a methanol-oxygen fuel cell is generally around one volt.

The point B at the right extremity of the curve is referred to as the limiting current. At this point the potential difference between the electrodes approaches zero. The limiting current may be thought of as the current obtained if the electrodes of a fuel cell were short circuited while limiting the feed rate of a reactant. In order for a methanol-air fuel cell, for example, to produce electrical current it is necessary that methanol be electrocatalytically oxidized at the anode while oxygen is electrocatalytically reduced at the cathode. The two electrodes must be ionically communicated by an electrolyte. The limiting current of the fuel cell is approached as the maximum rate of supply of any one of the reactants is approached. Since the electrocatalyst incorporated in the electrodes is the most expensive single part of the fuel cell, it is usually the quantity of electrocatalyst present that determines the maximum current. This can never exceed the limiting current which could be supported by the feed rate of reactants and is usually substantially below the limiting current. In conventional applications excess quantities of both fuel and oxidant are supplied to insure that the electrocatalyst is efficiently utilized.

The point C on the curve corresponds to the current and potential combination that will allow the maximum power output to be obtained from the fuel cell. It has been shown that the point C can be located for any given polarization curve by extrapolating to a potential at zero current as indicated by point D and operating the fuel cell at one half that potential, indicated at E. It is conventional practice to operate fuel cells somewhere between points A and C. While it would appear logical to attempt to operate a fuel cell near its maximum power output, the fact is that fuel cell voltages are generally much lower than the voltages desired. Accordingly, it is generally considered preferable to maximize the voltage level obtainable from a fuel cell, even if this involves something less than optimum power. Fuel cells may be used to meet variable electrical requirements. In such case, a fuel cell might operate transiently in the portion of the polarization curve defined by points B and C. Fuel cells are not conventionally designed to operate continuously in this region, however, due to the double penalties of low voltage output and low power output.

In the practice of my process electrical energy is generated by supplying a low molecular weight monohydric alcohol having less than about four carbon atoms to a pourous anode and electrochemically oxidizing the alcohol. Although ethanol, propanol, and isopropanol are utilizable, methanol is preferred and the basis of cost and its complete oxidation characteristics. Simultaneously oxidant is supplied to a porous cathode and is electrochemically reduced. The anode and the cathode are ionically communicated by an electrode. Conventional porous anodes and cathodes are employed. They may incorporate noble metals as electrocatalysts. Generally platinum-ruthenium alloys are preferred anode electrocatalysts. The noble metals may be supported on a material such as carbon, boron carbide, etc. It is a specific feature of my invention that it is not necessary to limit the cathode to electrocatalysts which are selective to the reduction of oxygen and catalytically passive toward the alcohols, although such electrocatalysts may be used, if desired. Conventional electrolytes may be employed. Aqueous alkali hydroxides are preferred electrolytes. Although somewhat more costly, quaternary ammonium hydroxides or phosphonium hydroxides may alternately be used. It is recognized that an acid electrolyte could be alternately employed. Common acid electrolytes, such as sulfuric acid, phosphoric acid, etc., may be employed as well as conventional cation exchange membranes.

It is an inventive feature of my process that the rate at which alcohol is delivered to the anode is limited so that it controls the limiting current of the fuel cell. That is, if the anode and the cathode were short circuited, the methanol feed rate would be current controlling. This is in direct contrast to conventional practice in which it is the amount of electrocatalyst present that controls the maximum current, both oxidant and alcohol being present in more than the required amounts.

A second feature of my process is that an alectrical load is placed across the anode and the cathode having a resistance value chosen to draw an electrical current only slightly less than the limiting current. Point F in FIG. 1 illustrates such an operating condition. Assuming that each molecule of alcohol supplied to the anode may contribute six electrons to the electrical load, the alcohol feed rate necessary to produce a limiting current of B can be readily calculated. It is also apparent that in operating at point F on the polarization curve, the current G that is actually produced is only slightly less than the limiting current and requires that most of the alcohol be consumed at the anode. At the same time, it is noted that by maintaining the limiting current only slightly in excess of the operating current, the potential produced is still maintained at an appreciable level. This is achieved by matching the electrical load and the limiting current so that the anode does not operate in an alcohol starved condition—that is, alcohol in excess of electrochemical requirements is always present. The preferred operating condition is at incipient alcohol starvation. Numerically, the operating current should be within about 15 percent of the limiting current.

My process is considered to be particularly useful for applications where the electrical load has a fixed resistive value or a resistance value that varies only within narrow limits. In such circumstance a fixed alcohol feed rate may be utilized. A high efficiency of alcohol consumption is obtained. The excess alcohol may be electrochemically reacted with the oxidant at the cathode or, alternately, may evaporate into the oxidant. At no time, however, is an excessive amount of alcohol lost by evaporation, nor is there any danger of any uncontrolled burning of alcohol at the cathode.

It is anticipated that in the ordinary application the electrical load requirements will be first determined, and that the alcohol feed rate will be adjusted to match the limiting current to the desired current. Noting FIG. 1, for example, it is apparent that point B can be moved toward zero current at will merely by limiting the rate of alcohol feed. It is further pointed out that it is not essential to operate below maximum power output C as indicated in the curve, since by limiting the alcohol feed, operation at or near the maximum power output can still be achieved. As an alternative, it is recognized that the limiting current for any given feed rate can be first determined and the electrical load then chosen to match.

My invention is particularly advantageous for meeting low power requirements over extended periods of time. In such applications the amount of electrocatalyst required is quite small. Accordingly, there is no significant economic penalty for failing to utilize the electrocatalyst to its maximum capacity. At the same time, the highly efficient utilization of alcohol is quite important, since it allows extended periods of unattended operation between times when the fuel supply must be replenished. Additionally, efficient alcohol utilization allows the entire fuel cell and fuel package to occupy a small volume. This feature is very important to a number of applications.

A preferred apparatus for the practice of my invention is illustrated in FIG. 2, in which a fuel cell unit 100 is formed of a tubular housing 102. While the tubular housing is shown to be of circular cross-section, it is appreciated that it could just as well be of any desired cross-sectional configuration—i.e., elliptical, polygonal, irregular, etc. A liquid impervious plug 104 is mounted adjacent one end of the tubular housing. An alcohol permeable plug 106 is mounted within the housing spaced from the plug 104 to define a fuel chamber 108.

Mounted in face abutment with the plug 106 is a porous anode 110. A porous cathode 112 is mounted in spaced relation to the anode but spaced from the end of the tubular housing. Immobilized electrolyte means 114 is confined between the anode and the cathode. An electrical load 116 is connected to the anode by an electrical lead 118 and to the cathode by a lead 120.

The elements which make up the fuel cell unit 100 are per se conventional. The tubular housing may be formed of any electrically insulative material. Glass and plastic tubing are examples of suitable housing materials. Alternatively, the tubular housing could be formed of metal tubing having an electrically insulative internal lining or coating. This lining or coating could, if desired, be limited to the area at which the cathode and/or anode contact the housing.

The liquid impervious plug may be simply a stopper. Preferably a plug is chosen that is gas pervious but liquid impervious. Plugs of this type are formed by providing small diameter perforations in hydrophobic materials. For example, suitable liquid impervious, gas pervious plugs may be formed by perforating a polytetrafluoroethylene plug or in coating a thin layer of a hydrophobic resin on a cloth backing. Any conventional liquid impervious, gas pervious plug may be employed. It is recognized that the plug could, if desired, be formed integrally with the tubular housing. Also, when the fuel cell unit is vertically oriented, the plug may be omitted entirely.

A conventional porous anode capable of electrochemically oxidizing methanol and any conventional porous cathode capable of electrochemically reducing an oxidant, such as oxygen, peroxides, etc., may be employed. In their simplest form the electrodes may be simply finely divided platinum metal coatings on the surface of the ion exchange membrane or matrix lying therebetween. A significant feature of the invention is that it is not necessary that the cathode be limited to electrocatalysts that are catalytically active toward the oxidant and catalytically passive toward alcohol.

The choice of electrolytes may be made in accordance with the prior description of my process. The electrolyte concentration is not critical, as is generally appreciated in the art. In the preferred form of the apparatus the electrolyte between the anode and the cathode is immobilized. In one form the electrolyte may be a cation exchange membrane. Where the electrolyte is an aqueous solution, it may be held immobilized by capillary action in a porous matrix penetrable by the electrolyte and chemically inert to the electrolyte and the electrodes. The matrix in one preferred form is comprised of a compacted disk of asbestos. In another form an ion exchange membrane may be employed as a matrix. If desired, a free aqueous electrolyte may be used alone, and the cathode relied upon to prevent leakage of electrolyte from the unit. In this instance, it is necessary that the cathode be wet-proofed so as to be gas pervious and liquid impervious. In the simplest form such a cathode may be formed by merely forming a thin layer of a hydrophobic material adjacent the outer face of the cathode.

The alcohol pervious plug 106 is formed of a composition and thickness to allow a desired fixed permeation rate. It is known, for example, that various synthetic resins and rubbers are permeated by alcohols at differing rates. In each instance, however, the rate of permeation is inversely proportional to the thickness of the material. Generally, high rates of permeation for a given thickness are obtainable with silicone rubber, whereas fluorocarbon polymers exhibit relatively low permeation rates. Thus, by proper choice among the wide variety of plastics and rubbers known to the art a plug can be chosen having the desired permeation rate.

Table I below illustrates the permeation rate for various plastics. Rates were obtained by confining methanol in a closed container utilizing the material to be tested as the upper wall. The outside of the wall was continuously swept with nitrogen. The amount of methanol permeating the wall was noted as a weight loss from the container. Measurements were taken at $25 \pm 3°$ C. To illustrate the value of the permeation rates, the limiting currents that can be supported thereby are also listed.

| Material tested | Thickness (mils) | Permeation rate (g./l. hr.-cm.$^2$) Observed | At 1 mil | Limiting current (ma./cm.$^2$) For tested thickness | At 1 mil |
|---|---|---|---|---|---|
| Silicone rubber | 33.0 | $3.05 \times 10^{-3}$ | $1.01 \times 10^{-1}$ | 15.3 | 506 |
| Do | 14.3 | $6.72 \times 10^{-3}$ | $9.61 \times 10^{-2}$ | 33.7 | 482 |
| Teflon-FEP [1] | 0.5 | $5.94 \times 10^{-4}$ | $2.97 \times 10^{-4}$ | 0.298 | 0.149 |
| Tedlar [2] | 1.1 | $3.2 \times 10^{-4}$ | $3.52 \times 10^{-4}$ | 0.161 | 0.177 |
| Cellulose acetate | 0.9 | $1.84 \times 10^{-2}$ | $1.66 \times 10^{-2}$ | 92.0 | 83 |
| Cellophane | 1.02 | $2.26 \times 10^{-3}$ | $2.30 \times 10^{-3}$ | 11.3 | 11.5 |
| Polyethylene | 3.5 | $1.65 \times 10^{-4}$ | $5.77 \times 10^{-4}$ | 0.828 | 2.90 |
| Fluorel [3] | 15.8 | $1.01 \times 10^{-3}$ | $1.60 \times 10^{-2}$ | 5.07 | 80.1 |

[1] Trademark for perfluorinated copolymer of ethylene and propylene.
[2] Trademark for polyvinylfluoride.
[3] Trademark for perfluorinated elastomer.

FIG. 3 illustrates an alternate plug construction 200, which may be substituted for plug 106. A portion 202 of the plug is formed of an alcohol impervious material having a plurality of small, through pores 204. A second portion 206, generally similar to plug 106, lies adjacent the impervious portion. The second portion is formed of an alcohol pervious material. A portion of the material is shown extending into the through pores as indicated at 208.

The pores 204 allow the alcohol to penetrate the impervious plug portion. The portion 206 allows the alcohol to diffuse laterally as it permeates, thus assuring uniform distribution of alcohol at the anode. The portion of the alcohol pervious material within the pores 204 assures a close calibration of the rate of alcohol permeation through the plug. For example, if an error of 20 mils is made in the thickness of plug 106, this will have a significant effect on the rate of alcohol penetration of the plug. On the other hand, an error of similar magnitude in filling the pores 204 will not produce as high a variation in permeation rate, since a much more permeable material would in this instance be used. It is recognized that in some applications it may be desirable to utilize the portion 202 alone or in combination with the alcohol pervious material 208 confined within the pores 204.

Although one of the distinct advantages of our fuel cell unit is the ease with which it can be manufactured and assembled, this is considered to be sufficiently obvious so as not to require detailed description.

In an exemplary application of the fuel cell unit 100, the electrical current and potential to be supplied to the load 116 are first determined. A plug 106 is then selected of a composition and thickness to allow alcohol penetration at a rate to support a limiting current slightly in excess of the anticipated current of operation. Alcohol is then supplied to the fuel chamber 108 and operation starts.

Most of the alcohol penetrating the plug 106 is reacted electrochemically at the anode to produce electricity. At the same time oxygen from the air reacts at the cathode. Alcohol in excess of that required to support the current migrates to the cathode and reacts with air or is evaporated into the air.

In the case of an acid electrolyte, a mole of carbon dioxide will be generated for each mole of methanol consumed. The carbon dioxide may migrate through the electrolyte means and escape through the cathode. Also, the gas may penetrate the plug 106 and escape from the fuel chamber through the plug 104, which is preferably gas permeable. In the case of an alkaline electrolyte it is anticipated that carbonates will be formed at the cathode. These may penetrate the plug 106 and collect in the fuel chamber. While the use of the plug 104 is preferred to lend attitude insensitivity to the fuel cell unit, it is appreciated that it may be removed and the unit operated with that end of the housing elevated. Also, although the cathode is shown recessed from one end of the tubular housing to prevent excessive drying of the electrolyte by convection currents, the cathode may be mounted flush with the end of the tubular housing.

While I have described my process together with a preferred apparatus for its practice, it is appreciated that my process may be practiced with any conventional fuel cell unit utilizing alcohol as a fuel. For example, alcohol may be supplied to a fuel battery from a storage tank through a distribution manifold controlled by a flow valve. Controlling the setting of the flow valve will control the alcohol feed rate to the fuel cells of the battery. According to another possible mode, an orifice may be used to limit the rate of alcohol feed to an anode. As can be readily appreciated, however, the fuel cell unit 100 is generally more compact, simpler in construction, less expensive, and more suitable to the low alcohol feed rates to be expected in low power applications than the alternate combinations described above.

What I claim as new and desire to secure by Letters Patent of the United States is:

1. In a process of generating electrical energy in which
   a monohydric alcohol containing less than four carbon atoms is electrochemically oxidized at a porous anode,
   oxidant is electrochemically reduced at a porous cathode,
   the anode and the cathode are ionically communicated by an electrolyte, and
   electrical energy is supplied to an external electrical load connected between the anode and the cathode,
   the improvement comprising
      restricting the rate of alcohol supply to the anode
         limiting the current obtainable to short circuited current, and
         continuously maintaining the electrical current of the electrical load less than the limiting current.

2. A process of generating electrical energy according to claim 1 in which the electrical current drawn is within 15 percent of the limiting curent.

3. A process of generating electrical energy according to claim 1 in which the electrical current drawn is chosen to produce incipient alcohol starvation at the anode.

4. A process of generating electrical energy according to claim 1 in which the alcohol supplied to the anode in excess of the electrochemical requirements is delivered to the cathode.

5. A process of generating electrical energy according to claim 4 in which the alcohol delivered to the cathode is chemically consumed.

6. In a fuel cell comprised of
a porous aonde,
a porous cathode,
electrolyte means ionically communicating said anode and said cathode, and
means for introducing alcohol into contact with said anode,
the improvement comprising
an alcohol permeable element for controlling the rate at which alcohol is supplied to said anode, the alcohol permeable element comprising a layer of alcohol impervious material having through pores.

7. A fuel cell according to claim 6 in which the pores in said alcohol impervious material are at least partially filled with an alcohol pervious material.

References Cited

UNITED STATES PATENTS

| 3,276,909 | 10/1966 | Moos | 136—86 |
| 3,281,273 | 10/1966 | Oser | 136—86 |

ALLEN B. CURTIS, Primary Examiner